United States Patent [19]

Porter

[11] Patent Number: 5,167,298
[45] Date of Patent: Dec. 1, 1992

[54] CLIMBING APPARATUS

[76] Inventor: William M. Porter, 531 Burlington St., Wadesboro, N.C. 28170

[21] Appl. No.: 639,255

[22] Filed: Jan. 9, 1991

[51] Int. Cl.$^5$ ............................................. A47C 9/00
[52] U.S. Cl. .................................. 182/187; 182/135
[58] Field of Search ............... 182/187, 188, 134, 135, 182/136, 152; 108/152

[56] References Cited

U.S. PATENT DOCUMENTS

| | | | |
|---|---|---|---|
| 4,331,216 | 5/1982 | Amacker | 182/187 X |
| 4,417,645 | 11/1983 | Untz | 182/135 |
| 4,549,633 | 10/1985 | Merritt | 182/187 X |
| 4,667,773 | 5/1987 | Davis | 168/152 X |
| 4,726,447 | 2/1988 | Gibson et al. | 182/187 X |
| 4,936,415 | 6/1990 | Williams | 182/187 |
| 4,969,538 | 11/1990 | Amacker | 182/133 X |

Primary Examiner—Karen J. Chotkowski

[57] ABSTRACT

A portable climbing apparatus consisting of an upper member that supports users body in a sitting or standing position facing toward or away from a tree or columnar like member, featuring a novel one piece continuous length of tubular steel rigid rail assembly and elevated cross bar portion shaped to proved multiple functions as a back rest, foot rest, and forward safety rail or guard member that house a half hexagon shaped tubular steel tree engagement member in telescopic alignment that cooperatively encircles a tree between two opposing sets of steel gripper members. A detachable seat member featuring three horizontal placement positions: one (1) near the base of tree used as an equipment shelf, seat or shooting rest, and two (2) positions to either the right or left lateral side of stand sitting/standing main frame platform member for use as an equipment shelf or shooting rest platform and used in either of these two positions when ascending and descending a tree or columnar like member. A lower foot climber member that supports user's feet and has the same opposing grippers and tree engagement member in telescopic alignment to the rail assembly with apertures provided in each rail member to adjust the length of the tree engagement member legs to varying diameter trees.

4 Claims, 3 Drawing Sheets

CLIMBING APPARATUS

BACKGROUND OF THE INVENTION

1. Field of the Invention

Hunters and observers of game animals have long realized the importance of gaining elevation from ground level to get above the animals line of sight, to avoid detection by the animals keen sense of smell, and to increase the hunter or observers visibility of the area.

Portable tree climbing stands, seats, and platforms that allow one to obtain elevation have been the subject of many previous patents which depict a variety of construction techniques and art forms. Compromise between physical weight, size, strength, user comfort, portability, method of attachment to the tree, ease of operation, mode of use; standing, sitting, or a combination of both, facing tree or facing away from the tree, and probably the most important, user safety, are but some of the major variables of the art.

This invention is an improvement in user safety and comfort for tree climbing apparatus or device.

2. Description of Prior Art

Tree climbing devices have been the subject of many patents including the following:

U.S. Pat. No. 3,385,320 to Jones, December 1969
U.S. Pat. No. 3,960,240 to Cotton, Jun. 1, 1976
U.S. Pat. No. 4,137,995 to Fonte, Feb. 6, 1979
U.S. Pat. No. 4,230,203 to Sweat, Oct. 28, 1980
U.S. Pat. No. 4,316,526 to Amacker, Feb. 23, 1982
U.S. Pat. No. 4,321,983 to Nelson, Mar. 30, 1982
U.S. Pat. No. 4,331,216 to Amacker, May 25, 1982
U.S. Pat. No. 4,417,645 to Untz, Nov. 29, 1983
U.S. Pat. No. 4,452,338 to Untz, Jun. 5, 1984
U.S. Pat. No. 4,953,662 to Porter, Sep. 4, 1990

These patents feature two separate members operating independent of each other, with the user's feet operating the lower device usually called a foot climber, and the user's arms operating the upper unit or stand.

Some devices require the user to sit facing the tree while others allow the user to sit with back against the tree, and a few permit the user a combination of both. U.S. Pat. No. 3,960,240 to Cotton allows the user to climb and descend a tree while facing away from the tree, but this places the user in an awkward and unsafe position while raising and lowering the members. Furthermore, the user of any climbing device should be able to see the tree or structure being climbed since some trees are prone to have decayed or rotten cavities which could result in a serious accident if not detected in due time. U.S. Pat. No. 4,230,203 to Sweat attempts to solve the problem of climbing a tree while facing it. Sweat requires repositioning the body on the upper climbing member in order to have the user's back against the tree with user facing away from the tree. This increases the visibility and mobility while standing on the lower member's platform and using upper member as a seat. This also allows the use of archery equipment which requires more forward room away from the tree. Again user safety is sacrificed since one must step out of the upper climbing member and back onto the lower member platform one leg at a time. The user could disengage the upper member's grippers while making the 180 degree turn on the platform resulting in loosing balance and one's safety would depend on an auxiliary safety strap or harness not the subject of this patent. Another disadvantage of this type of climbing apparatus requires the user to straddle the means that makes contact with tree or other columnar like structure on the upper climbing device where user's sensitive lower anatomy can easily make contact with the means. A serious accident is very possible if the lower climbing member slips and allows user to fall downward making contact with said member between user's legs. U.S. Pat. No. 4,316,526 to Amacker on Feb. 23, 1982 offers a stable two piece climbing apparatus but user is facing the tree which restricts the user's field of view and furthermore archery equipment is very difficult to use with this stand. It should be noted that no back support is provided and user must straddle as the means as in Sweat. The steel spike grippers have been known to dig into soft wood trees so deep that is was very difficult to disengage the grippers with user's feet.

Amacker 4,331,216 solved the problem of user restriction as to facing the tree when the desired height was reached by making a much larger lower climbing member and also a large upper climbing member which has a sliding detachable seat permitting the user to sit against tree, using the tree as a back rest. However, the user is positioned inside the rectangular frame which provides some safety but restricts a person using archery equipment. One can use archery equipment, but it's easy to strike the front and side member with said equipment creating a noise that alerts game animals. When using the detachable sliding seat in the forward position away from the tree, there is no back rest provided to support user's back which is uncomfortable. It should be further noted that when the seat on the upper member is against the tree with user facing away from the tree, the upper member's forward frame is used as a foot support or rest. The user's legs have to be extended extremely high in an uncomfortable and awkward position, especially if the proper distance for sitting is maintained between the upper and lower member. Again the two steel spike grippers have been known to dig very deep into soft wood bark trees requiring a very difficult task for the user to remove them by upward pressure provided by the feet and legs. U.S. Pat. No. 4,321,983 to Nelson discloses a climbing apparatus consisting of an upper climbing device that supports user's body with user's feet extending downward through an opening allowing user's feet to operate a lower climbing device that supports user's feet. Once user has reached the desired elevation the upper climbing device can be used to sit on with a back rest member provided. User can also stand on the seat or platform and can position a cloth seat attached between the two side frame members to sit upon and rest user's back against the tree. This stand offers the user a lot of versatility but has no forward safety means to keep user from stepping off the platform when standing upright. Side to side stabilization is impaired since the platform member is attached to the two side frame members by bolts, flanges and nuts. And the forward wedge support member is not permanently attached between the two side frame members allowing the side frame members to flex. It should be noted that the wedge used to secure the climbing stand to the tree has a limited contact area against tree, and the upper engaging bar member that contacts opposite side of said tree has no external grippers provided on said engaging bar member to securely engage said tree. The lower device or foot climber has no platform available to secure user's feet to said device and required good balance and skill on user's part to operate the said device. The physical weight of this stand is also heavy since larger diameter tubing has to be used due to the extreme forces created between the forward wedge and engaging bar member due to lever type action as a result of the closeness of the forward wedge and engaging bar member.

In Untz U.S. Pat. No. 4,417,645 the user faces the tree while climbing and when the desired height is reached the user can continue to sit on the platform with feet resting on lower members platform or can stand on lower member's platform and turn around facing away from said tree. However, when using archery equipment, the fixed back rest support offers a forward obstruction to archery equipment and due to lower members small size, user stability and mobility is impaired. Another disadvantage of the lower climbing member is the bar that is welded for support between the arms and used as the means to place feet under the said bar to left the climbing member to disengage and engage the said climbing member, only limited control is provided for the climbing member, and requires extra effort and skill to use on trees having a scaly, loose bark, and again the space for the user's feet is very limited.

Untz in U.S. Pat. No. 4,452,338 solved the problem of using the upper climbing member to sit on or stand on with the addition of a dual purpose seat that could be used as a back rest while sitting on the platform. Seat could also swing or pivot upward against the tree to be used a seat. Archery equipment could now be used without any forward or side restriction, especially when standing on the upper climbing member platform. However, in order to raise the seat upward and against the tree, the user must step onto the platform and while raising the seat upward, one must step over and around the seat one foot and leg at a time. Even with an auxiliary safety strap or harness attached from user to said tree, the danger exists to loose balance while pivoting the seat upward to rest against said tree. Another disadvantage of the above patent is when user is standing on the upper member platform which has a limited usable forward platform size when its seat back is in place against the tree, there is no forward means to prevent the user from falling off the platform.

The following U.S. Patents depict telescoping components used on tree climbing devices that allow the said devices to be able to adjust to varying tree diameters, and to level the said devices using a variety of anchoring methods:

U.S. Pat. No. 4,022,292 to Van Gompel on May 10, 1977
U.S. Pat. No. 4,316,526 to Amacker on Feb. 23, 1982
U.S. Pat. No. 4,321,983 to Nelson on Mar. 30, 1982
U.S. Pat. No. 4,331,216 to Amacker on May 25, 1982
U.S. Pat. No. 4,417,645 to Untz on Nov. 29, 1983
U.S. Pat. No. 4,452,338 to Untz on Jun. 5, 1984
U.S. Pat. No. 4,582,165 to Latini on Apr. 15, 1986
U.S. Pat. No. 4,726,447 to Gibson on Feb. 23, 1988
U.S. Pat. No. 4,953,662 to Porter on Sep. 4, 1990

The following U.S. Patents further show a variety of one piece and/or disconnect loops with different auxiliary grippers attached to encircle and engage a tree or columnar like structure to level the tree climbing device, and to further provide adjustability for varying diameter trees and to keep said climbing device in a stable position.

U.S. Pat. No. 3,338,332 to Brantly on Aug. 29, 1967
U.S. Pat. No. 3,955,645 to Dye on May 11, 1976
U.S. Pat. No. 4,022,292 to Van Gompel on May 10, 1977
U.S. Pat. No. 4,321,983 to Nelson on Mar. 30, 1982
U.S. Pat. No. 4,417,645 to Untz on Nov. 29, 1982
U.S. Pat. No. 4,452,338 to Untz on Jun. 5, 1984
U.S. Pat. No. 4,890,694 to Williams on Jan. 2, 1990
U.S. Pat. No. 4,953,662 to Porter on Sep. 4, 1990

The following U.S. Patents depict stands with seats attached and/or fold-down seats attached:

U.S. Pat. No. 3,338,332 to Brantley on Jan. 21, 1966
U.S. Pat. No. 3,419,108 to Mobbs on Oct. 10, 1966
U.S. Pat. No. 3,485,320 to Jones on Dec. 23, 1969
U.S. Pat. No. 3,730,294 to Thurmond on May 1, 1973
U.S. Pat. No. 4,120,379 to Carter on Oct. 17, 1978
U.S. Pat. No. 4,134,474 to Stavenah on Jan. 16, 1979
U.S. Pat. No. 4,236,602 to Leggett on Dec. 2, 1980
U.S. Pat. No. 4,321,983 to Nelson on Mar. 30, 1982
U.S. Pat. No. 4,369,858 to Babb on Jan. 25, 1983
U.S. Pat. No. 4,452,338 to Untz on Jun. 5, 1984
U.S. Pat. No. 4,582,165 to Latini on Apr. 15, 1986
U.S. Pat. No. 4,890,694 to Williams on Jan. 2, 1990
U.S. Pat. No. 4,953,662 to Porter on Sep. 4, 1990

At least three (3) U.S. Pat. Nos.: 4,321,983 to Nelson, 4,452,338 to Untz, and 4,953,662 to Porter, allow the user to position an auxiliary seat member against the base of a tree to use the sitting platform as a foot rest and standing platform and the auxiliary seat member as a seat, however, they do not allow the auxiliary seat member to have a second and third placement position to either lateral side of the stand main frame member assembly to function as an equipment rest and shooting rest platform member which is desirable while gun hunting.

SUMMARY OF THE INVENTION

This invention provides a tree climbing apparatus which has improved safety and comfort consisting of two separate units working in conjunction with each other to encircle and engage a tree or columnar like structure between two separate sets of steel grippers on each device whereby the user can safely climb said tree and once the desired elevation is obtained can comfortably sit on the upper member (stand) while facing toward or away from said tree and with a fixed safety rail in place.

The invention provides an improved safety feature in moving from a position facing the tree to one facing away from the tree. This invention permits the user while sitting on upper stand platform to remove a spacious durable seat from tubular holder means that are attached to upright side gussets by simply raising the seat upward until seat legs are removed from the tubular seat leg holders whereby the seat can be re-positioned near the base of the tree to sit upon with back resting against the base of the tree. User can safely make the transition from sitting on the stand platform to sitting on the seat platform. Said seat is stored to either side of the stand rigid rail assembly while ascending and descending a tree or columnar like structure.

It is a further feature of the invention to improve safety and comfort by providing a novel one piece continuous length of tubular steel shaped to provide the multiple functions of a back rest, foot rest and safety rail. It is attached to stand's frame and further house a half hexagon shaped tubular tree engagement portion with two welded steel grippers attached to encircle and engaged a tree and to adjust to varying tree diameters and provide a stable means of holding said stand in position. The one piece continuous length of tubular steel is designed to provide a fixed back rest which can be padded for user comfort which also serves as a foot rest when using the seat to sit on while user's back is resting against tree, and most importantly, a forward safety rail or guard when standing on stand platform to use archery equipment or firearms requiring one to stand in certain situations. The safety rail or guard restricts the user's forward movement without placing a serious limitation when using extra long equipment such as used in the sport of archery.

It is an additional feature of the invention to provide a foot climbing apparatus that will safely support the user's feet and body weight and allow the user the necessary control of the said device to climb and descend trees and columnar like structures and have the ability to grip said tree or structures, and further have adjustability to fit varying diameter trees within its size capacity. This is accomplished by providing a rectangular shaped resilient tie down strap which allows the user's feet to be placed under the strap giving the user the means to control the foot climber in an efficient manner.

It is further aspect of the invention to provide a half hexagon shaped (three 60° angles or bends) tubular steel gripper means with two welded steel grippers that will adequately grip trees and columnar like structures yet not dig into the tree bark or surface to the extent where permanent damage to said tree is present. The grippers with 45° beveled edges are so spaced apart on said gripper to add stability to prevent accidental slippage and provide side to side stability for the climbing stand or foot climber. The steel grippers provide firm contact with said tree yet are able to be easily disengaged because of the 45° beveled edges without any undue effort on user's part.

It is a further aspect of the invention to provide two horizontal bracket members attached to the half hexagon shaped tree engagement member to provide increased stability without adding considerable weight to said member.

It is a further feature of the invention to provide a rope, cord or strap that is attached from the upper stand to the lower foot climber and designed to limit the stroke length of user's legs when operating both devices. By limiting the stroke length the user maintains the proper distance between the foot stand and the seat.

It is a feature of the invention to provide a detachable seat member with placement to either side of the stand main frame and rigid rail assembly with seat placement in a generally horizontal position which allows the user a shooting platform; i.e., rifle or pistol rest, or an equipment rest, and additional placement near the base of the tree to either sit upon with back against the base of the tree or used as a shooting platform or equipment rest.

It is still further aspect of the invention to provide tubular seat leg holders which allows the user the means to select one of the aforementioned seat and shooting platform positions and further allows the detachable seat platform member legs to be telescopically inserted into the seat leg holder members which improves user safety by positioning the seat leg holders and seat leg members to the outside portion of the stand main frame and rigid rail assembly which does not interfere and make undue contact with the user or user'equipment which further reduces noise that could alert game animals.

It is an additional feature of the invention to provide a seat weight transfer means to distribute user's weight while sitting on the detachable seat member near the base of the tree onto the rigid rail and main frame assembly which causes the gripper blades on the tree engagement means and the gripper blades on the stand main frame assembly to provide adequate contact pressure against the tree.

It if further feature of the invention to improve user safety by providing a detachable seat member platform with increased forward placement away from the base of the tree to more adequately cover the opening when user desires to stand onto the stand main frame platform which reduces the user's chance of stepping through the opening provided on the stand main frame platform that allows user's feet to extend downward to operate the lower foot climber member.

It is still further feature of the invention to permit the use of archery equipment when standing on upper stand platform without any undue restriction, yet by the use of a novel safety rail or guard to offer a safety feature to restrict the user's forward motion and define the forward limit of the stands platform.

DETAILED DESCRIPTION OF PREFERRED EMBODIMENTS

Figure 1:
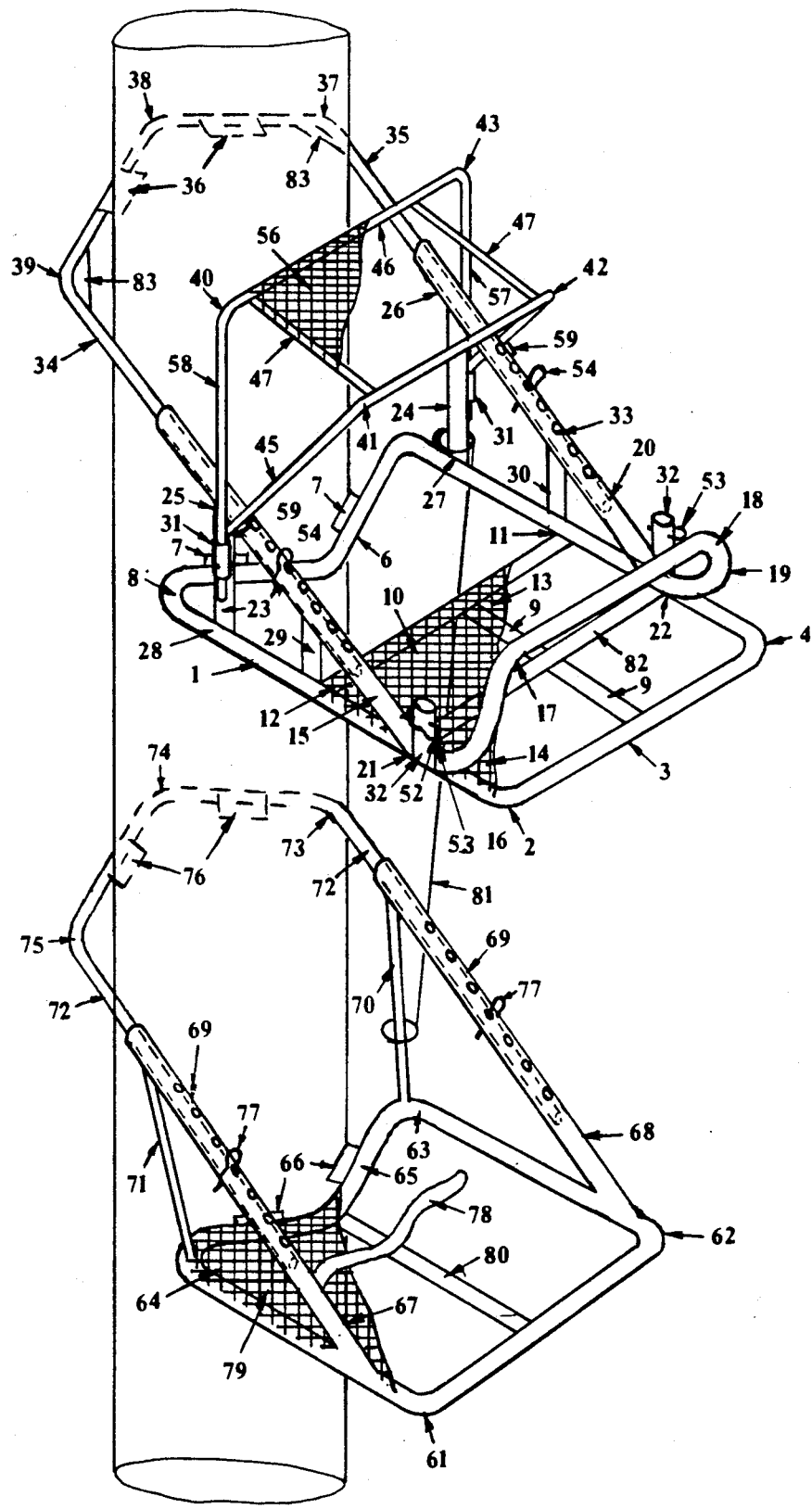
FIG. 1 is an isometric view of a preferred embodiment of the climbing device of the present invention in an operating condition.
Figure 2:
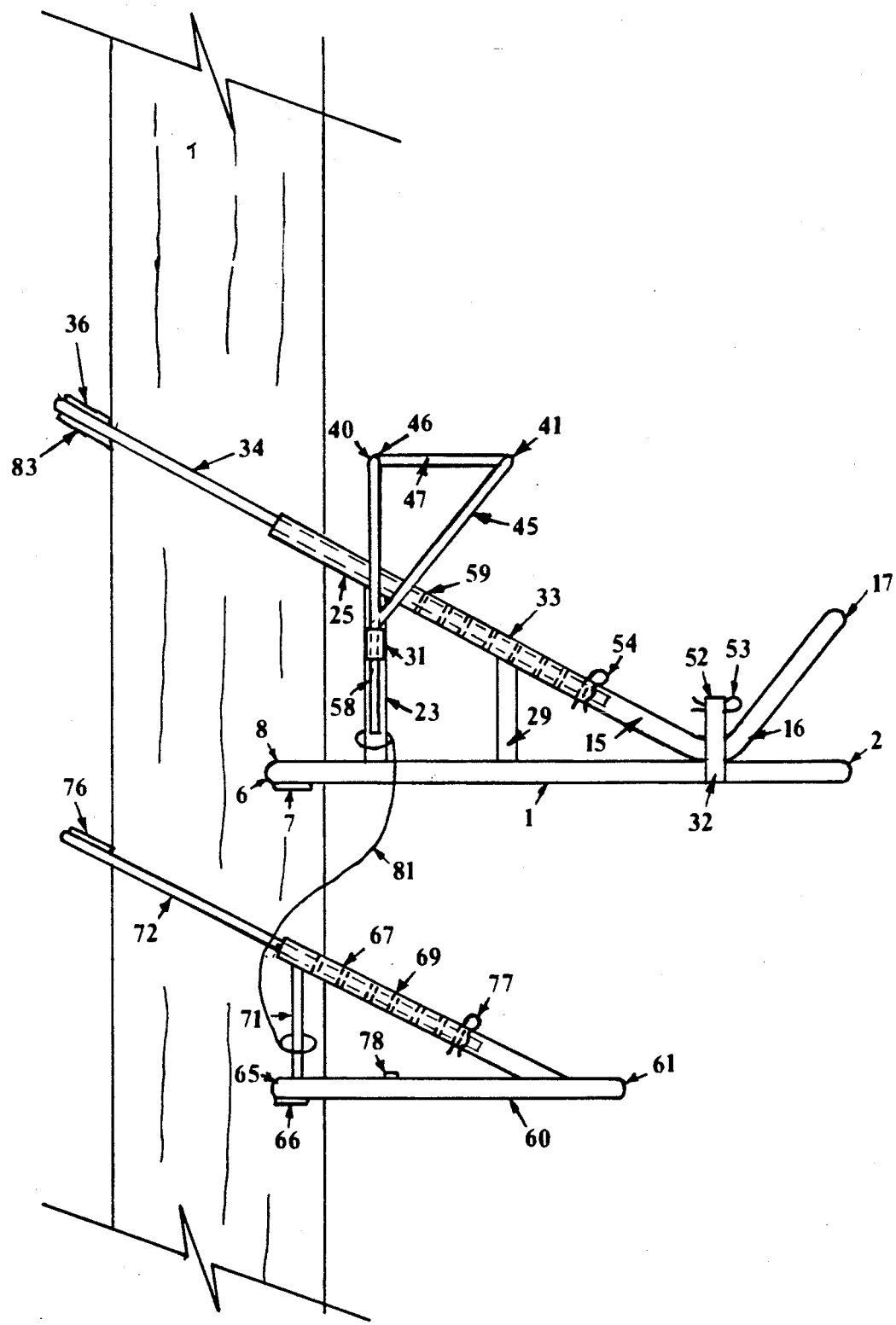
FIG. 2 is a side view of the preferred embodiment illustrated in FIG. 1
Figure 3:
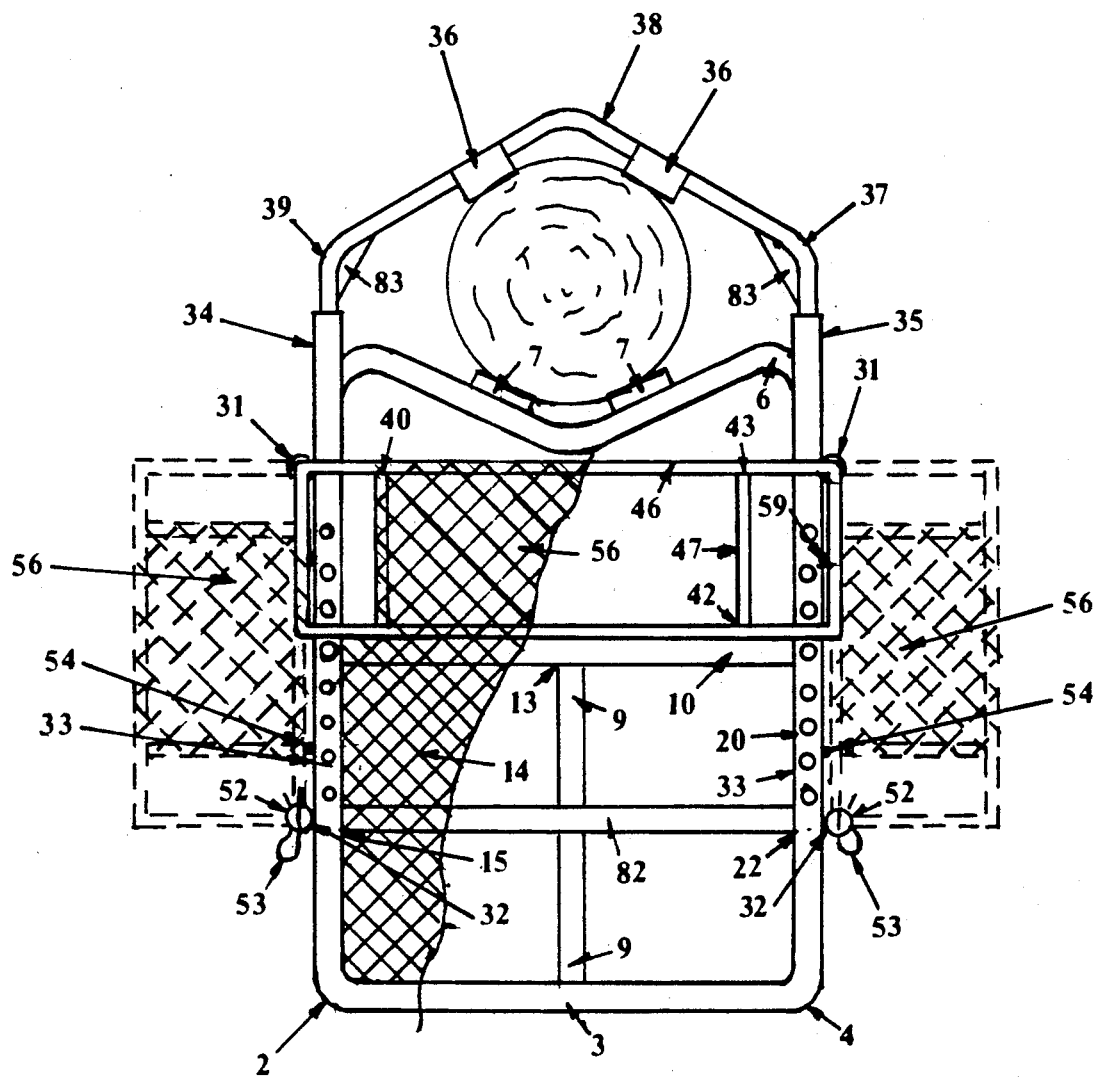
FIG. 3 is a top view of the preferred embodiment of the upper climbing member stand with alternate seat and shooting platform lateral positions.

Referring to FIGS. 1, 2 and 3 the upper stand supports user's body in a sitting or standing position and consists of a main frame support member 1 formed from one piece of tubular steel by making 90° bends at 2, 4, 5 and 8. Tubing at bends 5 and 8 are cut at the approximate center of their bend at an angle to weld a length of tubing member 6 called a gripper support brace member which has a 60° bend at its center and member 6 welded to member 1 at 5 and 8. (Optional) main frame support member 1 and gripper support member 6 formed from one continuous length of tubular steel and joined at reference 3 eliminating welds at 5 and 8. Transverse brace member 10 welded at 11 and 12 and brace member 82 identical to brace member 10 is welded to main frame member near reference 21, 22. Two additional brace members 9 are centered and welded between brace member 10 and 82 for additional support means for platform member 14. Steel tree engagement gripper blades 7 is welded to member 6 and spaced an equal distance from the center of the 60° bend. Welded to main frame support member 1 is platform 14 preferably 14 gauge expanded metal or other appropriate material with enough strength to support user's body weight. Rigid rail brace member 15 is bent from one continuous length of tubular steel and has 90° bends at 17 and 18 to form a rectangular shaped member and then bent at approximately a 80° angle about 12 inches from bends 17 and 18 to form bends 16 and 19 with rigid rail brace member 20 being equal in length to rigid rail member 15 and with a matching angle. Rigid rail members 15, 20 are welded to main frame support member 1 at 21, 22 and welded to two rear upright braces or gussets 23, 24 at 25 and 26 with other end of gussets welded at 27, 28 to frame member 1. The distance formed between bends 17, 18 is termed a back rest, foot rest, and a safety rail or guard and can be padded for user comfort by a variety of materials and methods. An optional horizontal transverse brace (not illustrated) can be added between the back rest upright vertical sections as a means to secure an optional back rest padded member and to allow the user's lower legs above the ankles to make contact with said back rest support member to alert user when standing upright on stand platform member that the forward portion of platform has been reached. This horizontal transverse brace member acts as a dual forward safety rail or guard member.

An additional optional brace member (not illustrated) can be added between each rigid rail member near the lower hole or aperture drilled in each rigid rail member near the center upright gusset members 29, 30 and welded to the upright portion above the 80° bend where the back rest, foot rest, and safety rail or guard member starts which offers increased side restriction as a safety means and further strengthens the 80° bend area that is welded to the forward main frame support member.

The length of the rear upright braces or gussets 23, 24 are of a length to give at least a 30° inclination for the rigid rails 15 and 20 which gives adequate separation between tree engagement grippers 7 and 36 for stability. Welded between main frame support member 1 and rigid rails 15, 20 are two (2) shorter upright braces or gussets 29, 30 that offer additional side to side stabilization for rigid rails 15, 20. Two upright seat leg tubular holder members 31 are attached to rear upright brace members 23, 24 to the outside surface in parallel relationship to allow the detachable seat leg members 57, 58 to be telescopically inserted into seat leg holder members 31. Two additional seat leg tubular holder members 32 are welded to the rigid rail members 15, 20 and the main frame platform member 1 near reference 21, 22 in an upright position for telescopic alignment of seat leg members 57 or 58. An aperture 52 is drilled through seat leg tubular members 32 to contain clip pin member 53 that allows the seat leg member 57 or 58 to rest on top of clip pins 53 and clip pins 53 may be used as spare pins in the event pins 54 and 77 become lost. Seat leg members 57, 58 are of sufficient length to protrude through seat leg holder members 31 that it is not necessary to have other attachment means since the detachable seat member is stored in an upstanding position. Rigid rails 15, 20 have a plurality of apertures drilled through their center for adjusting the half hexagon shaped tubular steel tree engagement member legs 34, 35 that will slide inside rigid rails 15, 20 and each leg member 34, 35 has an aperture drilled near the end of legs 34, 35 to allow a clip pin 54 or similar device to be passed through rigid rails 15, 20 at apertures 33 of each leg 34, 35 for alignment of both members 34, 15 and 35, 20. Optional alignment aperture(s) (not illustrated) on half hexagon tree engagement member stand and foot climber with two (2) apertures on each leg member 34, 35 and member legs 72 near the terminal end of each leg member being spaced one half or one and one half times the spacing distance of rigid rail apertures 33 and 69 which allows the stand and foot climber to be more precisely leveled to a horizontal position on varying diameter trees within the capacity of the stand or foot climber member. The half hexagon shaped tubular steel tree engagement member is formed from one length of tubular steel of a size that will fit inside rigid rail members 15, 20 and has a 60° bend at center 38 and equal bends at 37, 39 an equal distance from center bend 38 of a width that will allow legs 34, 35 to fit inside rigid rail members 15, 20. Horizontal brackets 83 of 16 gauge flat sheet steel at 1½" width × 5" length with radius on one side of bracket to match the radius of 60° bend at 37, 39 of half hexagon tubular steel tree engagement member and welded at each bend 37, 39 used to strengthen each 60° bend. Two 12 gauge steel tree engagement gripper blades 36 are formed from flat sheet steel and have a 45° bend about ¼" from one of the longer sides and a bevel cut on opposite edge away from the tubular steel half hexagon shaped tree engagement member that makes contact with the tree. Gripper blades 36 are welded to hexagon shaped tree engagement member an equal distance from center bend 38 with bevel side downward toward lower gripper blades 7 for gripping action similar to a wood chisel. Alignment apertures 33 in rigid rail member 15,20 allows the tree engagement member legs 34, 35 to adjust inside rigid rails 15, 20 for varying tree diameters.

Detachable seat member is formed by bending tubular steel at 40, 43 with 90° bends forming legs 57, 58. Tubular steel is bent at 41, 42 with 90° bends forming bracing means 44, 45. Two (2) transverse bracing means 47 are attached (welded) between bends 40, 41 and 42, 43 leaving a rectangular area covered by seat platform member 56 of expanded metal or other suitable materials that have adequate strength. Bracing means 44, 45 is welded to legs 57, 58.

Attached to rigid rail member 15, 20 parallel to the outer most edge and positioned about 4" from reference 25, 26 is seat weight transfer means member 59 constructed of a ½" square steel bar approximately ¾" in length which transfers the users weight when seat is positioned near the base of the tree onto the rigid rail members 15, 20 and further reduces any torque applied to the rear seat leg tubular holder members 31 and further causes the tree engagement gripper members 7 and 36 to provide adequate contact pressure against a tree or columnar structure when user is sitting on the detachable seat member near the base of said tree.

The lower member called a foot climber consists of a main frame support member 60 formed from one length of tubular steel with 90° bends at 61, 62, 63 and 64. Frame support member 60 is cut at bends 63, 64 of appropriate angle to weld tree engagement gripper support member 65 which is formed from tubular steel with a 60° bend at its center and member 65 is welded to main frame support member 60 at 63, 64. (Optional) main frame support member 60 and gripper support member 65 formed from one continuous length of tubing joined adjacent member 80 eliminating welds at 63 and 64. Gripper support member 65 has two (2) steel gripper blade members 66 identical to stands gripper blades 7 and 36 and welded to gripper support member 65 at an equal distance from center bend to grip the tree. Welded to main frame support member 60 near bends 61, 62 is tubular steel members 67, 68 termed rigid rails which have a plurality of apertures 69 drilled through each rail equal distance apart which provide for adjustment of the half hexagon shaped tubular steel tree engagement legs 72 by inserting legs 72 inside rigid rails 67, 68 and aligning the aperture provided in each leg 72 and apertures 69 on both rigid rails 67, 68 and inserting clip pin 77 through both said members. Two (2) upright braces or gussets 70, 71 are welded between main frame support 60 near the terminal ends near reference 63, 64 and rigid rails 67, 68 near their terminal ends. The half hexagon shaped tubular steel tree engagement member is formed from one length of tubular steel with a 60° bend at 74 and two additional 60° bends at 73 and 75 with two (2) equal length legs 72 that will slide inside the rigid rail members 67, 68. Welded to the half hexagon shaped tubular steel tree engagement member are two steel gripper blades 76 which are identical to gripper blades 66, 7 and 36 already described. A rectangular shaped rubber strap or bungee tie down cord 78 is attached to wire mesh platform 79 by using wire compression rings, wire or similar attachment to allow the user to place feet underneath said strap to keep user's feet attached to foot climber platform 79. Wire mesh platform 79 is welded to foot climber main frame support member 60 and is of a thickness to adequately support user's feet and body weight. A transverse brace member 80 of tubular steel is welded between main frame support member 60 and tree engagement gripper member 65 and is centered between said frame support member 60 and member 65 to support platform member 79.

The preferred method of operating the upper climbing member or stand and the lower climbing member foot climber will be described and understood by reference to FIG. 1, FIG. 2 and FIG. 3 although alternate methods are possible to suit individual user preferences. Position both stand and foot climber near the base of tree or columnar structure and remove the half hexagon shaped tubular steel tree engagement member legs 34, 35 from stand rigid rails 15, 20 of stand by removing clip pins 54 from alignment apertures 33. Position the detachable seat member to one side of the stand inserting seat leg member 58 into the rear tubular seat leg holder member 31 and the other detachable seat leg member 57 into the forward seat leg holder member 32. Detachable seat member will be positioned to the left side of stand assembly adjacent rigid rail member 15. Detachable seat will position to either side of the stand assembly in an upstanding position with the seat platform in a generally horizontal position. Make certain the seat brace members 44, 45 are positioned away from the side of the stand frame and rigid rail assembly. Place stand member 6 gripper blades 7 against the base of the tree with stand resting on the ground. Place half hexagon shaped tubular steel tree engagement member legs 34, 35 around the opposite side of the tree and insert member legs 34, 35 into rigid rails 15, 20 until contact is made from stand gripper blades 7 and gripper blade members 36. At this time while holding one side of leg 34 or 35, raise stand upward a couple of feet off the ground and tilt stand upward to allow for any tree diameter taper. Align legs 34, 35 to nearest alignment aperture 33 in rigid rails 15, 20 and insert clip pin 54 through both members 34, 15 and 35, 20. The stand is slid further upward and to one side out of the way while the foot climber is attached to said tree. The half hexagon shaped tubular steel tree engagement member legs 72 are removed from rigid rails 67, 68 of the foot climber by removing the two clip pins 77 and pulling member legs 72 out of the rigid rails 67, 68. Place the half hexagon shaped tubular steel tree engagement member legs 72 around the tree and insert legs 72 into rigid rails 67, 68 and push the legs 72 into rails 67, 68 until lower gripper members 66 and upper gripper members 76 make contact with both sides of the tree. Tilt the foot climber frame upward at an angle to allow for any tree diameter taper and align the tree engagement member legs 72 with apertures 69 in rigid rails 67, 68 with the closest alignment apertures 69 and insert clip pin 77 through both rigid rails 67, 68 and tree engagement member legs 72. With the stand and foot climber attached to the tree user is ready to get onto the stand and foot climber. Reposition the stand and foot climber very near to the ground and foot climber very close to the stand. While holding to stands rigid rails 15 or 20 step on stand platform member 14 and then place legs through stand opening defined by member 10 and member 6 and step onto lower foot climber platform 79. If stand and foot climber are positioned close enough to ground level, user can step directly through the stand opening as defined above onto the foot climber platform member 79. User can then sit on stand platform member 14 and insert feet under the foot climber rectangular rubber tie down strap member 78 by stretching the strap upward with one hand while sliding the feet under said strap. Once user's feet are under foot strap member 78 on platform 79, user is ready to climb the tree. User stands upright and raises or slides stand vertically by lifting stand upward with both hands by maintaining a grip or hand position on stand rigid rail members 15 and 20 between the rear gussets 23, 24 and center gussets 29, 30. To raise the stand upward, user should tilt stand platform member 14 upward to allow lower gripper members 7 to disengage from tree and the upper gripper members 36 on the half hexagon shaped tubular steel member to also disengage. The stand is raised or slid upward until the platform member 14 and stand frame member 10 are resting under user's buttocks. User tilts stand downward until gripper members 7 and 36 make firm contact with tree. User then sits on stand platform member 14 and gripper members 7 and 36 will dig into tree making firm secure contact. User then raises the foot climber that is attached to user's feet and legs by tilting the foot climber platform member 79 upward by raising the heels and lowering user's toes downward. This will cause the foot climber gripper members 66 and 76 to disengage from the tree. User can now raise legs upward raising or sliding the foot climber vertically along said tree until foot climber is positioned very near the base of stand. The majority of user's weight should now be placed on the heels of the user's feet which causes foot climber gripper members 66 and 76 to dig into said tree making firm contact. User now repeats the aforementioned process of standing upright and raising or sliding stand vertically until the stand platform member 14 is again resting against user's buttocks. Once stand gripper members 7 and 36 have made firm engagement with said tree, user then sits on platform member 14, and the foot climber member is again raised as aforementioned and once the user is at the desired elevation the foot climber is then raised to a comfortable distance below the stand. User can now continue to sit on stand platform member 14 with back resting against the back rest area between member 17, 18 of the one piece rigid rail assembly 15, 20, and one further has the option to use the detachable seat member positioned to either side of the stand main frame assembly for use as a shooting platform support means offering a stable resting position. The detachable seat is positioned into the tubular seat leg holders at a height to be comfortable (normal seat sitting distance) which is also an ideal height above the stand sitting platform for use as the aforementioned shooting platform position as in rifle and pistol hunting. The user has the option to reposition the detachable seat member near the base of the tree by raising the seat member upward until the seat leg members 57, 58 clear the tubular seat leg holders 31, 32. The detachable seat legs 57, 58 are inserted into the rear tubular seat leg holder members 31 with the detachable seat frame member reference 46 toward the base of the tree. Push seat legs downward until the detachable seat member brace means 44, 45 make contact with the seat weight transfer means 59. The detachable seat member can now be used a forward rifle, pistol, camera or forearm rest allowing the user an excellent stable resting platform. At this time, user can pull up whatever equipment intended to be used.

The user now has the option to use the seat platform member 56 to sit upon and use stand platform member 14 to rest feet on. While user is sitting on stand platform member 14, user can use the back rest 17, 18 as an additional support by holding onto the area between reference 17, 18 with either hand while turning body at an angle from said back rest. User then rests hand or forearm not being used to hold onto the back rest and raise body upright off stand platform member 14 bringing one foot/leg from the foot climber platform member 79 and through the stand opening defined by members 10 and 6 and placing said foot on stand platform member 14 and continue to pivot the body placing buttocks on seat platform member 56 and releasing the hand grip on back rest area between members 17, 18. User can now use the back rest area between member 17, 18 as a foot rest for additional support and comfort. User may also wish to use the said foot rest to brace one foot/leg on, and use the elbow and forearm resting against same leg resting on foot rest member 17, 18. User's elbow and arm will rest near the knee of said leg to form a stable support when user wishes an extra degree of steadiness to support a firearm to make a long shot. User wishing to stand on platform member 14 may do so by leaning body slightly forward and standing upright. It is obvious that when using long equipment such as that used in the sport of archery, one has to have extra room forward from said tree without any undue restriction. This stand fulfills that need by not placing obstructions in front of user at excessive height off stand platform 14, and to the side of user in such a manner that will restrict the user or his equipment, yet not depart from the area of safety. The area defined between member 17, 18 of stand now serves an additional very useful, unique and novel purpose as a forward safety rail or guard which defines the forward limit of stand platform member 14 and also offers some side restriction. User may wish to use the forward safety rail or guard as a means to brace the lower leg against for additional support when standing upright and using archery equipment. When shooting directly in front of the stand, archery equipment requires increased forward room on platform member 14.

When user desires to descend the tree, equipment may be lowered to the ground using an optional rope or cord and positioned away from the base of the tree. User will sit on stand platform member 14 and insert feet through the opening as defined by stand members 10 and 6 and place feet under the rectangular rubber tie down strap member 78 on foot climber platform member 79. If the seat is in the forward position near the base of the tree, user lifts the detachable seat member upward until the seat legs 57, 58 are removed from the rear tubular seat leg holder members 31. The seat is repositioned to either side of the stand frame assembly and rigid rail members 15, 20 with the detachable seat leg members 57, 58 inserted into tubular seat leg holder members 31 and 32 with the detachable seat frame assembly reference 46 adjacent to the rigid rail members 15 or 20. User is now ready to descend said tree by raising the heels of the feet and lowering the toes of the feet at the same time. This action causes the foot climber gripper members 66 and 76 to disengage from said tree.

User now lowers the foot climber to leg length as determined by the length of member 81 while holding to stand rigid rails 15 and 20 and then places full weight on the heels of the feet causing grippers 66 and 76 to grip said tree. User then disengages the stand gripper members 7 and 36 by tilting stand platform member 14 slightly upward by using the hands positioned on rigid 15 and 20 positioned on rigid rails 15 and 20 near the center gussets 29 and 30. Once gripper members 7 and 36 have disengaged from said tree, stand is allowed to slide downward resting very close to the lower foot climber member. The foot climber is now disengaged and the process is repeated until the foot climber is resting very near the ground. User can then remove feet from the foot climber strap 78 on platform member 79. User now stands upright and steps off the foot climber onto the ground by holding onto the stand rigid rails 15, 20 if so desired for extra balance and support. User will normally step off the stand opposite the side the detachable seat member is positioned on. Stand is removed from said tree by removing the two clip pins 54 from the rigid rail members 15, 20 and pulling stand away from said tree causing the half hexagon shaped tubular steel tree engagement member legs 34, 35 to be removed from rigid rails 15 and 20. Tree engagement member is then removed from said tree and placed back into the rigid rail members 15, 20. The two clip pins 54 are then replaced back through rigid rails 15, 20 and member legs 34, 35. Foot climber is removed from said tree by removing the two clip pins 77 from rigid rails 67, 68 and pulls foot climber away from said tree causing the half hexagon shaped tubular steel tree engagement gripper member legs 72 to free the ends of rigid rail members 67, 68. The half hexagon shaped tubular steel tree engagement member legs 72 are then placed back into the rigid rail members 67, 68 and clip pins 77 inserted through the desired alignment apertures 69. Foot climber is then placed with the stand in whatever position is desired to transport both devices.

Although the invention has been described with respect to preferred embodiments, it is not to be so limited since various alternations, changes, deviations, modifications and departures may be made by those skilled in the art to the embodiments shown, and are within the spirit and intended scope of the present invention.

Now that the invention has been described,
What is claimed is:

1. An apparatus for climbing a tree or like vertical columnar member comprising an upper member including a main frame support member having a gripper support brace member attached to terminal ends of the main frame support member, gripper blades attached to said gripper support brace member and positioned to provide gripping pressure against a tree, a rigid rail brace member attached to said main frame support member opposite the terminal ends thereof, a tree engagement member with corner bends in telescopic sliding adjustment engagement with open ends of the rigid rail brace member for selectively affixing the rigid rail brace member to a tree, horizontal brackets positioned across each corner bend of the tree engagement member, gripper blades attached to said tree engagement member and positioned to provide gripping pressure against the tree, a plurality of rear upright braces positioned near the terminal ends of the main frame support member and joining the main frame support member to the rigid rail brace member, a platform disposed on the main frame support member, a plurality of shorter upright braces joining said main frame support member and rigid rail brace member, a pair of upright seat leg tubular holder members mounted on the rear upright braces, a pair of seat leg tubular holder members mounted to the rigid rail brace member and main frame support member, a detachable seat member telescopically engageable into said upright seat leg tubular holder members, and a foot climber member.

2. The apparatus of claim 1 wherein the detachable seat member is characterized by a pair of legs and bracing means with terminal ends of said bracing means attached to said legs in an angular position, two transverse bracing means attached between the legs and the bracing means with a rectangular opening covered by a platform member in a horizontal position, the detachable seat platform member nearly covering the forward portion of the opening provided between the gripper support brace member and the main frame support member.

3. An apparatus according to claim 1 wherein the foot climber member is characterized in that it comprises a main frame support member and a gripper support member formed from one continuous length of tubing with one weld joint connecting two terminal ends of the tubing.

4. An apparatus according to claim 1 wherein the foot climber member is characterized in that it includes a half-hexagon shaped tree engagement member with attached gripper means comprising a pair of gripper blades having not greater than 45 degree angle edges for contacting said tree.

* * * * *